US007312259B2

(12) United States Patent
Adamo et al.

(10) Patent No.: US 7,312,259 B2
(45) Date of Patent: Dec. 25, 2007

(54) PROCESS FOR MANUFACTURING POLYMERS

(75) Inventors: Joseph Robert Adamo, Souderton, PA (US); Ching-Jen Chang, Ambler, PA (US); Hailan Guo, Warrington, PA (US); Charles Elwood Jones, Yardley, PA (US); Stephane Pierre Jean Ugazio, Cabris (FR)

(73) Assignee: Rohm and Haas Company, Philadelphia, PA (US)

( * ) Notice: Subject to any disclaimer, the term of this patent is extended or adjusted under 35 U.S.C. 154(b) by 383 days.

(21) Appl. No.: 10/896,485

(22) Filed: Jul. 22, 2004

(65) Prior Publication Data

US 2005/0043458 A1 Feb. 24, 2005

(30) Foreign Application Priority Data

Aug. 21, 2003 (EP) .................................. 03292062

(51) Int. Cl.
*B29B 9/08* (2006.01)
*C08J 3/12* (2006.01)
*C08J 3/16* (2006.01)
*C08J 3/205* (2006.01)

(52) U.S. Cl. .................................. 523/342; 528/502 E

(58) Field of Classification Search ................ 523/342; 528/502 E

See application file for complete search history.

(56) References Cited

U.S. PATENT DOCUMENTS

| | | | | |
|---|---|---|---|---|
| 3,971,835 | A | 7/1976 | Myers et al. | |
| 4,427,836 | A | 1/1984 | Kowalski et al. | |
| 4,456,726 | A | 6/1984 | Siol et al. | |
| 4,468,498 | A | 8/1984 | Kowalski et al. | |
| 4,469,825 | A | 9/1984 | Kowalski et al. | |
| 4,539,361 | A | 9/1985 | Siol et al. | |
| 4,569,991 | A * | 2/1986 | Fujino | 528/492 |
| 4,594,363 | A | 6/1986 | Blankenship et al. | |
| 4,677,003 | A | 6/1987 | Redlich et al. | |
| 4,910,229 | A | 3/1990 | Okubo | |
| 4,920,160 | A | 4/1990 | Chip et al. | |
| 4,970,241 | A | 11/1990 | Kowalski et al. | |
| 5,036,109 | A | 7/1991 | Chip et al. | |
| 5,102,693 | A | 4/1992 | Motosugi et al. | |
| 5,137,864 | A | 8/1992 | Yaguchi et al. | |
| 5,157,084 | A | 10/1992 | Lee et al. | |
| 5,216,044 | A | 6/1993 | Hoshino et al. | |
| 5,340,858 | A | 8/1994 | Bauer et al. | |
| 5,350,787 | A | 9/1994 | Aydin et al. | |
| 5,352,720 | A | 10/1994 | Aydin et al. | |
| 5,521,266 | A | 5/1996 | Lau | |
| 5,534,594 | A | 7/1996 | Troy et al. | |
| 5,589,557 | A | 12/1996 | Navarrini et al. | |
| 5,599,854 | A | 2/1997 | Troy et al. | |
| 5,663,213 | A | 9/1997 | Jones et al. | |
| 6,238,470 | B1 * | 5/2001 | Maver et al. | 106/162.1 |
| 6,384,104 | B1 | 5/2002 | Chang et al. | |

FOREIGN PATENT DOCUMENTS

| | | |
|---|---|---|
| EP | 0022663 | 1/1981 |
| EP | 0118325 | 9/1984 |
| EP | 0119054 | 9/1984 |
| EP | 0265142 | 4/1988 |
| EP | 0267726 | 5/1988 |
| EP | 0331421 | 9/1989 |
| EP | 0342944 | 11/1989 |
| EP | 0915108 | 5/1999 |
| EP | 0980887 | 2/2000 |
| EP | 1096025 | 5/2001 |
| EP | 1201692 | 5/2002 |
| JP | 49025041 | 3/1974 |
| JP | 59155402 | 9/1984 |
| JP | 06073138 A * | 3/1994 |

OTHER PUBLICATIONS

Translation to JP 06073138 (Mar. 1994).*

* cited by examiner

*Primary Examiner*—Kelechi C. Egwim

(57) ABSTRACT

The present invention relates to a process for preparing dry polymer granules having increased minimum ignition energy, lowered to unchanged maximum explosion pressure, lowered explosion strength (Kst) coupled with reduced dusting levels by drying a mixture including one or more emulsion polymers and one or more surfactants having HLB values between 10 and 25.

3 Claims, No Drawings

PROCESS FOR MANUFACTURING POLYMERS

CROSS REFERENCE TO RELATED APPLICATIONS

This is a non-provisional patent application of European patent application No. 03292062.1 filed Aug. 21, 2003.

The present invention relates to a process for preparing dried granules of dispersable polymers. More particularly, the invention is directed to a manufacturing process for preparing dry polymer granules, the dried polymer granules having utility in preparing compositions and formulations that are applied to an environment of use.

The primary reasons for granulating polymers are to improve rheology (e.g flow and deformation properties) of the polymer granules and reduce dust levels due to attrition of the polymer during processing, handling, conveying and storage. Significant dusting problems are associated with certain polymer powders. Highly cross-linked polymers and core shell polymers (e.g opaque polymers) having a "hard" shell tend to be more friable and exhibit significant dusting as solids. The friability of such polymer solids is magnified by low density polymer granules and polymers having primary powder particle sizes less than 75 μm prepared by spray drying latex particles having primary particle sizes less than 1 μm. Spray drying of such polymers present serious safety issues, including drying equipment venting and grounding, that are related to a combination of factors including significant dust levels in the polymer solids, low thermal stability of the polymer, low minimum ignition energy (MIE), high maximum explosion pressure (MEP) and significant explosivity strength (Kst). Indeed, it is the dusting issue which is of primary concern to polymer manufacturers, processors, formulators and process operators. The presence of even a low quantity of dust in the atmosphere of a factory poses a significant combustion/explosion risk and may provide a health risk to workers in contact with such polymers.

European Patent Publication No. EP 1 096 025 A1 discloses a process for rendering leather processing solids less dusting by adding a pre-determined amount of a solid leather treatment composition into a pre-determined amount of an aqueous diluent or carrier. Such solids include homopolymers of acrylic acid and copolymers comprising more than 50 wt. % of polymerized acrylic acid and basic salts thereof; polymers which are inherently hygroscopic. While such hygroscopic polymers reduce dusting of solid leather treatments they have no utility in reducing dusting of dried latex polymer particles containing a void and having a particle size from 50 to 1000 nanometers. In particular, the process does not significantly reduce the dusting problem associated with dried latex polymer particles including those comprising a shell portion prepared as described in U. S. Pat. No. 6,384,104.

Inventors have discovered a manufacturing process for preparing polymeric granules that are comparatively non-dusting solids, that do not exhibit decreased bulk densities, that are flowable powders and that have desired mechanical properties for incorporating into compositions and formulations including those used in personal care, cosmetic, consumer, and pharmaceutical products. In the process, drying of polymer latexes as described above with selected surfactants under relatively low pressure achieves non-dusting polymer solids that are flowable, having desirable powder properties, rheology, that do not exhibit decreased bulk densities, and that exhibit increased particle size.

Moreover, the dry granulated solids exhibit lowered or unchanged MEP and lowered Kst values such that they can be safely processed, manipulated and stored.

Accordingly, the invention provides a process for manufacturing a dry polymer composition having reduced dusting comprising the steps of: (a) combining one or more emulsion polymers and one or more surfactants having an HLB value between 10 and 25; and (b) drying the combination.

Moreover, the invention provides a process for preparing flowable, dry polymer solids having reduced dusting comprising: combining one or more emulsion polymers and one or more surfactants having an HLB value between 10 and 25; wherein the dry polymer solids have increased particle size, increased MIE, lowered or unchanged MEP and lowered Kst values.

The invention also provides a dry polymer composition having reduced dusting comprising: (a) one or more emulsion polymers and (b) one or more surfactants having an HLB value between 10 and 25; wherein the polymer composition is prepared by drying a dispersion comprising (a) and (b).

Polymers usefully employed in accordance with the invention are aqueous emulsion polymers. Suitable polymers include, but are not limited to, latex polymer particles. Latex particles useful in the method of this invention are latex particles that include voids and that are formed from a multi-staged particle comprising at least one core polymer and at least one shell polymer. The core polymer and shell polymer may be made in a single polymerization step or in a sequence of polymerization steps. Latex particles that include voids are also referred to as hollow sphere latex particles. Latex particles that include voids are also referred to as core shell latex polymers, wherein the core polymer is swellable with at least one swelling agent (also referred to as swellant) including solvents, water and aqueous bases, is swollen with at least one swelling agent, wherein the core is a void comprising water and wherein the void comprises at least one swelling agent. For the purposes of the present invention, the terms, "sheath" and "shell" are considered synonymous and refer to the total shell polymer composition (not including the core portion) prepared from single or multi-stage polymerizations. The emulsion polymers are prepared as dispersions, typically as aqueous dispersion.

According to one embodiment, suitable polymers include latex polymer particles having selected cross-linker levels used in a shell portion of the latex polymer particles that are based on: (1) monomeric compositions containing polyethylenically unsaturated monomers, (2) monomeric compositions containing multifunctional monomers having at least one functional group capable of vinyl copolymerization and at least one functional group capable of reaction with suitable reactive molecules to produce post-polymerization cross-linking, and (3) combinations thereof.

The latex polymer particles usefully employed in the invention have a particle size from 20 to 1000 nanometers (nm) (or 0.02 to 1 micron, μm), including particles sizes from 100 to 600 nm (0.1 to 0.6 μm), from 200 to 500 nm (0.2 to 0.5 μm), and from 300 to 400 nm (0.3 to 0.4 μm), as measured by a Brookhaven BI-90 photon correlation spectrometer.

For a given particle size, it is desirable to produce latex polymer particles with a maximum void fraction as current processing techniques and particle integrity will permit. Typically, the latex polymer particles contain a void or voids with a void fraction from 0.01 to 0.70, including void fractions from 0.05 to 0.50, from 0.10 to 0.40, and from 0.20 to 0.35. The void fractions are determined by comparing the volume occupied by the latex polymer particles after they have been compacted from a dilute dispersion in a centrifuge to the volume of non-voided particles of the same composition. Void fraction can also be expressed as a percentage (%).

The latex polymer particles useful in the invention are prepared by conventional polymerization techniques including sequential emulsion polymerization. Dispersions of the latex polymer particles are prepared according to processes including those disclosed in U.S. Pat. Nos. 4,427,836; 4,469,825; 4,594,363; 4,677,003; 4,920,160; and 4,970,241. The latex polymer particles may also be prepared, for example, by polymerization techniques disclosed in European Patent Applications EP 0 267 726; EP 0 331 421; EP 0 915 108 and U.S. Pat. Nos. 4,910,229; 5,157,084; 5,663,213 and 6,384,104.

In a separate embodiment, other emulsion polymer dispersions useful in the invention include heteropolymer dispersions, bimodal dispersions and dispersions prepared from water insoluble monomers. These latex polymer particles are prepared according to processes including those disclosed in U.S. Pat. Nos. 4,456,726, 4,468,498, 4,539,361, 5,521,266, 5,340,858, 5,350,787 or 5,352,720. The latex polymer particles may also be prepared, for example, by polymerization techniques disclosed in European Patent Applications EP 0 265 142, EP 0 119 054 and EP 0 118 325, EP 0 022 663 or EP 0 342 944.

In a separate embodiment, other latex particles useful in the invention are latex particles including minute void particles and layers that are expanded by expansion of a gas or a low boiling solvent in a foaming process, for example, that are disclosed in U.S. Pat. Nos. 5,102,693 and 5,137,864. This includes penetration of the shell polymer into the core polymer. Penetration of the shell polymer into the core polymer may be controlled by both thermodynamic and kinetic factors. Thermodynamic factors may determine the stability of the ultimate particle morphology according to the minimum surface free energy change principle. However, kinetic factors such as the viscosity of the core polymer at the polymerization temperature of the shell and the swelling time afforded the second stage polymer may modify the final degree of penetration. Thus, various process factors may control penetration of the shell into the core, and ultimately the morphology of the void structure in the expanded and dried particle. Such processes are known in the emulsion polymerization art such as, for example, in U.S. Pat. Nos. 5,036,109; 5,157,084; and 5,216,044. The glass transition temperature of the shell polymer is typically greater than 40° C. as calculated using the Fox equation; the particles may be cross-linked and may have functionalized surfaces.

Also contemplated are multi-modal particle size emulsion polymers wherein two or more distinct particle sizes or very broad distributions are provided as is taught in U.S. Pat. Nos. 5,340,858; 5,350,787; 5,352,720; 4,539,361; and 4,456,726.

As used herein, the term "sequentially emulsion polymerized" or "sequentially emulsion produced" refers to polymers (including homopolymers and copolymers) which are prepared in aqueous medium by an emulsion polymerization process in the presence of the dispersed polymer particles of a previously formed emulsion polymer such that the previously formed emulsion polymers are increased in size by deposition thereon of emulsion polymerized product of one or more successive monomer charges introduced into the medium containing the dispersed particles of the pre-formed emulsion polymer.

In the sequential emulsion polymerization of a multi-stage emulsion polymer, the term "seed" polymer is used to refer to an aqueous emulsion polymer dispersion which may be the initially-formed dispersion, that is, the product of a single stage of emulsion polymerization or it may be the emulsion polymer dispersion obtained at the end of any subsequent stage except the final stage of the sequential polymerization.

The glass transition temperature ("Tg") of the emulsion polymers used herein are those calculated by using the Fox equation (T.G. Fox, Bull. Am. Physics Soc., Volume 1, Issue No. 3, page 123(1956)). That is, for calculating the Tg of a copolymer of monomers M1 and M2, $$1/Tg(calc.)=w(M1)/Tg(M1)+w(M2)/Tg(M2)$$

wherein

- Tg(calc.) is the glass transition temperature calculated for the copolymer
- w(M1) is the weight fraction of monomer M1 in the copolymer
- w(M2) is the weight fraction of monomer M2 in the copolymer
- Tg(M1) is the glass transition temperature of the homopolymer of M1
- Tg(M2) is the glass transition temperature of the homopolymer of M2, all temperatures being in °K.

The glass transition temperatures of homopolymers may be found, for example, in "Polymer Handbook", edited by J. Brandrup and E. H. Immergut, Interscience Publishers.

According to one embodiment, latex polymer particles useful in the method of this invention are formed from a multi-staged particle comprising at least one core polymer and at least one shell polymer. The core polymer and shell polymers may each be made in a single polymerization step or in a sequence of polymerization steps. While the core may be made in single stage (or step) of the sequential polymerization and the shell may be the product of a single sequential step following the core stage, preparation of the core component may involve a plurality of steps in sequence followed by preparation of the shell, which may also involve a series of sequential steps. The amount of polymer deposited to form the shell portion or shell polymer is generally such as to provide an overall size of the finished multistage polymer particle of between 0.05 to 1 micron. The ratio of the core weight to the total polymer particle weight is from 1/4 (25 wt. % core) to 1/100 (1 wt. % core) and includes a ratio from 1/8 (12 wt. % core) to 1/50 (2 wt. % core).

The monomers used in the emulsion polymerization of the "core" (or "seed") polymer of the latex polymer particles preferably include at least 5 weight % of one or more monoethylenically unsaturated monomers containing at least one carboxylic acid group, based on total monomer weight of the core. The core polymer may be obtained, for example, by emulsion polymerization of monoethylenically unsaturated monomer containing at least one carboxylic acid group or by copolymerization of two or more of the monoethylenically unsaturated monomers containing at least one carboxylic acid group. Preferably, the monoethylenically unsaturated monomer containing at least one carboxylic acid group is copolymerized with one or more non-ionic (that is, having no ionizable group) ethylenically unsaturated monomers. The presence of the ionizable acid group makes the core swellable by the action of a swelling agent, such as an aqueous or gaseous medium containing a base to partially neutralize the acid core polymer and cause swelling by hydration.

As used herein, the term "(meth)acrylic" refers to either the corresponding acrylic or methacrylic acid and derivatives; similarly, the term "alkyl (meth)acrylate" refers to either the corresponding acrylate or methacrylate ester. As used herein, all percentages referred to will be expressed in weight percent (%), based on total weight of polymer or composition involved, unless specified otherwise.

Typically, emulsion polymers of the invention are water insoluble and are dispersible in water. As used herein, the term "water soluble", as applied to monomers, indicates that the monomer has a solubility of at least 1 gram per 100 grams of water, preferably at least 10 grams per 100 grams of water and more preferably at least about 50 grams per 100 grams of water. The term "water insoluble", as applied to monomers, refers to monoethylenically unsaturated monomers which have low or very low water solubility under the conditions of emulsion polymerization, as described in U.S. Pat. No. 5,521,266. An aqueous system refers to any solution containing water.

The core polymer may optionally contain from 1 to 20 wt. %, including from 2 to 10%, based on the total monomer weight of the core, of polyethylenically unsaturated monomer units, such as, for example, ethylene glycol di(meth) acrylate, allyl (meth)acrylate, 1,3-butanediol di(meth)acrylate, diethylene glycol di(meth)acrylate, trimethylolpropane tri(meth)acrylate and divinylbenzene. Alternatively, the core polymer may optionally contain from 0.1 to 60 wt. %, based on the total monomer weight of the core, of butadiene.

Suitable monoethylenically unsaturated monomers containing at least one carboxylic acid group useful in preparation of the "core" polymer, include, for example, acrylic acid, methacrylic acid, acryloxypropionic acid, (meth)acryloxypropionic acid, itaconic acid, aconitic acid, maleic acid or anhydride, fumaric acid, crotonic acid, monomethyl maleate, monomethyl fumarate and monomethyl itaconate. In one embodiment, the carboxylic acid group containing monomer is acrylic acid.

Suitable non-ionic ethylenically unsaturated monomers useful in preparation of the "core" polymer, include, for example, styrene, vinyltoluene, ethylene, vinyl acetate, vinyl chloride, vinylidene chloride, acrylonitrile, (meth)acrylamide, ($C_1$-$C_{22}$)alkyl and ($C_3$-$C_{20}$)alkenyl esters of (meth) acrylic acid, such as methyl (meth)acrylate, ethyl (meth) acrylate, butyl (meth)acrylate, 2-ethylhexyl (meth)acrylate, benzyl (meth)acrylate, lauryl (meth)acrylate, oleyl (meth) acrylate, palmityl (meth)acrylate and stearyl (meth)acrylate.

The monomers used in the emulsion polymerization of the "shell" (or "sheath") polymer of the latex polymer particles preferably comprise one or more non-ionic ethylenically unsaturated monomers. Optionally, one or more monoethylenically unsaturated monomers containing at least one carboxylic acid group may be polymerized in the shell, such as, for example, acrylic acid, methacrylic acid, acryloxypropionic acid, methacryloxypropionic acid, aconitic acid, crotonic acid, maleic acid (and derivatives such as corresponding anhydride, amides and esters), fumaric acid (and derivatives such as corresponding amides and esters), itaconic and citraconic acids (and derivatives such as corresponding anhydrides, amides and esters). Acrylic acid and methacrylic acid are preferred carboxylic acid group-containing monomers. When present in the shell polymer, the amount of carboxylic acid group-containing monomer units is from 0.1 to 10%, including from 0.5 to 5%, based on total weight of the shell portion of the polymer particle.

Optionally, one or more monoethylenically unsaturated monomers containing at least one "non-carboxylic" acid group may be polymerized in the shell, such as, for example, allylsulfonic acid, allylphosphonic acid, allyloxybenzenesulfonic acid, 2-acrylamido-2-methylpropanesulfonic acid (the acryonym "AMPS" for this monomer is a trademark of Lubrizol Corporation, Wickliffe, Ohio, USA), 2-hydroxy-3-(2-propenyloxy)propanesulfonic acid, 2-methyl-2-propene-1-sulfonic acid, 2-methacrylamido-2-methyl-1-propane-sulfonic acid, 3-methacrylamido-2-hydroxy-1-propanesulfonic acid, 3-sulfopropyl acrylate, 3-sulfopropyl methacrylate, isopropenylphosphonic acid, vinyl-phosphonic acid, phosphoethyl methacrylate, styrenesulfonic acid, vinylsulfonic acid and the alkali metal and ammonium salts thereof. Preferred unsaturated "non-carboxylic" acid monomers are 2-acrylamido-2-methyl-propanesulfonic acid (meth)acrylamide, ($C_1$-$C_{22}$)alkyl and ($C_3$-$C_{20}$)alkenyl esters of (meth) acrylic acid, such as methyl (meth)acrylate, ethyl (meth) acrylate, butyl (meth)acrylate, 2-ethylhexyl (meth)acrylate, benzyl (meth)acrylate, lauryl (meth)acrylate, oleyl (meth) acrylate, palmityl (meth)acrylate and stearyl (meth)acrylate.

The monomers used in the emulsion polymerization of the "shell" (or "sheath") polymer of the latex polymer particles preferably comprise one or more non-ionic ethylenically unsaturated monomers. Optionally, one or more monoethylenically unsaturated monomers containing at least one carboxylic acid group may be polymerized in the shell, such as, for example, acrylic acid, methacrylic acid, acryloxypropionic acid, methacryloxypropionic acid, aconitic acid, crotonic acid, maleic acid (and derivatives such as corresponding anhydride, amides and esters), fumaric acid (and derivatives such as corresponding amides and esters), itaconic and citraconic acids (and derivatives such as corresponding anhydrides, amides and esters). Acrylic acid and methacrylic acid are preferred carboxylic acid group-containing monomers. When present in the shell polymer, the amount of carboxylic acid group-containing monomer units is from 0.1 to 10%, including from 0.5 to 5%, based on total weight of the shell portion of the polymer particle.

Optionally, one or more monoethylenically unsaturated monomers containing at least one "non-carboxylic" acid group may be polymerized in the shell, such as, for example, allylsulfonic acid, allylphosphonic acid, allyloxybenzenesulfonic acid, 2-acrylamido-2-methylpropanesulfonic acid (the acryonym "AMPS" for this monomer is a trademark of Lubrizol Corporation, Wickliffe, Ohio, USA), 2-hydroxy-3-(2-propenyloxy)propanesulfonic acid, 2-methyl-2-propene-1-sulfonic acid, 2-methacrylamido-2-methyl-1-propane-sulfonic acid, 3-methacrylamido-2-hydroxy-1-propanesulfonic acid, 3-sulfopropyl acrylate, 3-sulfopropyl methacrylate, isopropenylphosphonic acid, vinyl-phosphonic acid, phosphoethyl methacrylate, styrenesulfonic acid, vinylsulfonic acid and the alkali metal and ammonium salts thereof. Preferred unsaturated "non-carboxylic" acid monomers are 2-acrylamido-2-methyl-propanesulfonic acid and styrenesulfonic acid. When present in the shell polymer, the amount of unsaturated "non-carboxylic" acid monomer units is from 0.5 to 10%, including from 1 to 5%, based on total weight of the shell portion of the polymer particle.

Suitable non-ionic ethylenically unsaturated monomers useful in preparing the shell polymer include, for example, vinyl acetate, acrylonitrile, methacrylonitrile, nitrogen-containing ring compound unsaturated monomers, vinylaromatic monomers, ethylenic monomers and selected (meth) acrylic acid derivatives. In one embodiment of the invention, the shell portion of the latex polymer particles comprises as polymerized units from zero to 95% (meth)acrylic acid derivative monomer and from zero to 80% vinylaromatic monomer, based on total weight of the shell portion.

In one embodiment, one class of (meth)acrylic acid derivative is represented by ($C_1$-$C_{22}$)alkyl (meth)acrylate, substituted (meth)acrylate and substituted (meth)acrylamide monomers. Each of the monomers can be a single monomer or a mixture having different numbers of carbon atoms in the alkyl portion. Preferably, the monomers are selected from one or more of ($C_1$-$C_4$)alkyl (meth)acrylates, hydroxy($C_2$-$C_4$)alkyl (meth)acrylates (such as hydroxyethyl methacrylate and hydroxypropyl methacrylate), dialkylamino($C_2$-$C_4$) alkyl (meth)acrylates (such as dimethylaminoethyl methacrylate) and dialkylamino($C_2$-$C_4$)alkyl (meth)acrylamides (such as dimethylaminopropyl methacrylamide). The alkyl portion of each monomer can be linear or branched.

Suitable examples of alkyl (meth)acrylate monomers where the alkyl group contains 1 to 4 carbon atoms include methyl methacrylate (MMA), methyl and ethyl acrylate, propyl methacrylate, butyl methacrylate (BMA), butyl acrylate (BA), isobutyl methacrylate (IBMA) and combinations thereof.

Suitable examples of alkyl (meth)acrylate monomers where the alkyl group contains 10 or more carbon atoms include decyl methacrylate, isodecyl methacrylate, dodecyl methacrylate (also known as lauryl methacrylate), tetradecyl methacrylate (also known as myristyl methacrylate), pentadecyl methacrylate, hexadecyl methacrylate (also known as cetyl methacrylate), octadecyl methacrylate (also known as stearyl methacrylate), eicosyl methacrylate, behenyl methacrylate and combinations thereof.

In one embodiment, the shell portion of the latex polymer particles comprises, as polymerized units, from 5 to 95%, including from 10 to 80% and from 20 to 70%, based on total weight of the shell portion, of (meth)acrylic acid derivative monomer selected from one or more of methyl acrylate, methyl methacrylate, ethyl acrylate, ethyl methacrylate, butyl acrylate, butyl methacrylate, isobutyl acrylate, isobutyl methacrylate, hydroxyethyl methacrylate, hydroxypropyl methacrylate, dimethylaminoethyl methacrylate and dimethylaminopropyl methacrylamide.

Suitable vinylaromatic monomers include, for example, styrene, α-methylstyrene, vinyltoluene, alkyl-substititued styrene (such as t-butylstyrene and ethylvinylbenzene), halogenated styrenes (such as chlorostyrene and 3,5-bis (trifluoromethyl)styrene); styrene, ethylvinylbenzene and t-butylstyrene are preferred vinylaromatic monomers. When present in the shell polymer, the amount of vinylaromatic monomer units is from 1 to 80%, including amounts of vinylaromatic monomer units from 5 to 70% and from 10 to 50%, based on total weight of the shell portion of the polymer particle.

Suitable examples of nitrogen-containing unsaturated ring compound monomers include vinylpyridine, 2-methyl-5-vinylpyridine, 2-ethyl-5-vinylpyridine, 3-methyl-5-vinylpyridine, 2,3-dimethyl-5-vinylpyridine, 2-methyl-3-ethyl-5-vinylpyridine, methyl-substituted quinolines and isoquinolines, 1-vinylimidazole, 2-methyl-1-vinylimidazole, N-vinylcaprolactam, N-vinylbutyrolactam and N-vinylpyrrolidone.

Additional suitable monomers include ethylenic monomers (for example, ethylene, propylene, isobutylene, long chain alkyl α-olefins (such as ($C_{10}$-$C_{20}$)alkyl α-olefins), vinyl halides (such as vinyl chloride, vinyl fluoride, vinyl bromide), vinylidene halides (such as vinylidene chloride and vinylidene fluoride), partially halogenated (meth)acrylates (such as 2-(perfluoro-dodecyl)ethyl acrylate, 2-(perfluorododecyl)ethyl methacrylate, 2-(perfluoro-hexyl)ethyl acrylate, 2-(perfluorohexyl)ethyl methacrylate, hexafluoroisopropyl methacrylate, 2,2,3,3-tetrafluoropropyl acrylate and 2,2,2-trifluoroethyl methacrylate), and partially halogenated alkenes (such as 1,1,1-trifluoro-2,2-(trifluoromethyl)-butene).

The glass transition temperature ($T_g$) of emulsion polymers usefully employed in accordance with the invention are of a wide range and will vary according to the polymer morphology (e.g. core shell, multi-stage) of a particular emulsion polymer.

According to one embodiment of the invention, monomers that comprise the shell are selected to provide a Tg in at least one shell which is high enough to support the void within the latex particle. Preferably the $T_g$ of at least one shell is greater than 50° C., more preferably greater than 60° C. and most preferably greater than 70° C., as measured by differential scanning calorimetry (DSC).

When the shell portion of the latex polymer particle is provided by a single stage polymerization process upon the core polymer, the entire shell portion produced may be referred to as the sheath, shell or "outermost" shell. However, when the shell portion is provided by a multi-stage polymerization process, then the "outermost" shell is defined by the composition of the final distinct polymerization stage used to prepare the latex particles. Typically, the "outermost" shell, when provided by a multistage polymerization process, will comprise at least about 25%, preferably at least 50% and more preferably at least 75% of the total shell portion of the latex polymer particle. Preferably, the cross-linking levels used to achieve the beneficial effects of the present invention are incorporated predominantly into the "outermost" shell of the latex particles. Cross-linking levels, unless indicated otherwise, are based on the total shell portion of the latex polymer particle, regardless of the number of stages used to prepare the latex particles.

The void of the latex polymer particles is preferably produced by swelling the acid core with an aqueous basic swellant that permeates the shell and expands the core. This expansion may involve partial merging of the outer periphery of the core into the pores of the inner periphery of the shell and also partial enlargement or bulging of the shell and the entire particle overall. When the swellant is removed by drying, shrinkage of the core polymer develops a microvoid, the extent of which depends on the resistance of the shell to restoration to its previous size. Suitable swelling agents for the core include, for example, ammonia, ammonium hydroxide, alkali metal hydroxides (such as sodium hydroxide), and volatile lower aliphatic amines (such as trimethylamine and triethylamine). The swelling step may occur during any of the multi-stage shell polymerization steps, between any of the staged polymerization steps, or at the end of the multi-stage polymerization process.

Cross-linking of the shell portion of the latex particles is required to achieve enhanced storage stability of UV radiation-absorption compositions. The cross-linking level is from 4 to 80%, including cross-linking levels from 5 to 70%, from 10 to 60% and from 20 to 50%, based on total weight of the shell polymer portion of the latex particles. For latex particles based on multi-stage polymerization, it is preferable that the cross-linking take place predominantly in the "outermost" shell of the latex particle; typically, the cross-linking level is from 10 to 100%, including cross-linking levels from 15 to 70% and from 20 to 60%, based on weight of the "outermost" shell polymer portion of the latex particles, where the cross-linking is based on polymerized monomer units of one or more polyethylenically unsaturated monomers and multifunctional monomers. At total shell cross-linking levels below 4%, the cross-linking level is not sufficient to provide satisfactory SPF Enhancement Retention of formulated personal care formulations containing the latex particles.

Cross-linking in the shell can be derived from the use of one or more of the polyethylenically unsaturated monomers. Suitable polyethylenically unsaturated cross-linkers include, for example, di(meth)acrylates, tri(meth)acrylates, tetra (meth)acrylates, polyallylic monomers, polyvinylic monomers and (meth)acrylic monomers having mixed ethylenic functionality.

Di(meth)acrylates cross-linkers useful in the present invention include, for example, bis(1-acryloxy-2-hydroxypropyl)phthalate, bis(1-methacryloxy-2-hydroxypropyl)-phthalate, bis(2-acryloxyethyl)phosphate, bis(2-methacryloxyethyl)phosphate, bis(acryloxy-2-hydroxypropyloxy) diethylene glycol, bis(methacryloxy-2-hydroxy-propyloxy) diethylene glycol, bisphenol A diacrylate, bisphenol A dimethacrylate, bisphenol A di-(3-acryloxyethyl) ether, bisphenol A di-(3-methacryloxyethyl) ether, bisphenol A di-(3-acryloxy-2-hydroxypropyl) ether, bisphenol A di-(3-methacryloxy-2-hydroxypropyl) ether, 1,3-butanediol diacrylate, 1,3-butanediol dimethacrylate, 1,4-butanediol di-(3-acryloxy-2-hydroxypropyl) ether, 1,4-butanediol di-(3-methacryloxy-2-hydroxypropyl) ether, 1,4-butanediol diacrylate, 1,4-butanediol dimethacrylate, 1,3-butanediol bis (acryloxypropionate), 1,3-butanediol bis(methacryloxypropionate), 1,4-butanediol bis(acryloxypropionate), 1,4-butanediol bis(methacryloxypropionate), 2-butene-1,4-diol diacrylate, 2-butene-1,4-diol dimethacrylate, 1,4-cyclohexanediol diacrylate, 1,4-cyclo-hexanediol dimethacrylate, 1,10-decanediol diacrylate, 1,10-decanediol dimethacrylate, diethylene glycol diacrylate, diethylene glycol dimethacrylate, 2,2-dimethyl-1,3-propanediol diacrylate, 2,2-dimethyl-1,3-propanediol dimeth-acrylate, dipentaerythritol ether acrylate, dipentaerythritol ether methacrylate, diphenolic acid di-(3-acryloxy-2-hydroxypropyl) ether, diphenolic acid di-(3-methacryloxy-2-hydroxypropyl) ether, dipropylene glycol diacrylate, dipropylene glycol dimethacrylate, 7,7,9-trimethyl-3, 13-dioxo-3, 14-dioxa-5, 12-diazahexa-decane-1,16-diol diacrylate], 7,7,9-trimethyl-3, 13-dioxo-3,14-dioxa-5, 12-diaza-hexadecane-1,16-diol dimethacrylate, 1,12-dodecanediol diacrylate, 1,12-dodec-anediol dimethacrylate, 1,2-ethanediol diacrylate, 1,2-ethanediol dimethacrylate, 1,2-ethanediol bis(acryloxypropionate), 1,2-ethanediol bis(methacryloxy-propionate), 1,6-hexanediol diacrylate, 1,6-hexanediol dimethacrylate, 1,9-nonanediol diacrylate, 1,9-nonanediol dimethacrylate, 1,5-pentanediol diacrylate, 1,5-pentanediol dimethacrylate, 1,4-phenylene-diacrylate, 1,4-phenyl-enedimethacrylate, 1-phenyl-1,2-ethanediol diacrylate, 1-phenyl-1,2-ethanediol dimethacrylate, polyoxyethyl-2,2-di(p-hydroxyphenyl)propane diacrylate, polyoxyethyl-2,2-di(p-hydroxyphenyl)propane dimethacrylate, 1,2-propanediol diacrylate, 1,2-propanediol dimethacrylate, 1,3-propanediol diacrylate, 1,3-propanediol dimethacrylate, propoxylated bisphenol A diacrylate, propoxylated bisphenol A dimethacrylate, tetrabromobisphenol A di-(3-acryloxy-2-hydroxy-propyl) ether, tetrabromobisphenol A di-(3-methacryloxy-2-hydroxypropyl) ether, tetrachlorobisphenol A di-(3-acryloxy-2-hydroxypropyl) ether, tetrachloro-bisphenol A di-(3-methacryloxy-2-hydroxypropyl) ether, tetraethylene glycol diacrylate, tetraethylene glycol dimethacrylate, triethylene glycol diacrylate, triethylene glycol dimethacrylate, 2,2,4-trimethyl-1, 3-pentanediol diacrylate, 2,2,4-trimethyl-1,3-pentanediol dimethacrylate, tripropylene glycol diacrylate, and tripropylene glycol dimethacrylate. Additional suitable di(methacrylates) cross-linkers include, for example, aromatic fluorinated diacrylates (see U.S. Pat. No. 5,380,901 for further general and specific details), fluorinated diacrylates having structure 1,3-[$CH_2$=$CHCO_2CH_2CHOHCH_2OC(CF_3)_2]_2$-$C_6H_3R_f$ where $R_f$=$C_1$-$C_{30}$ (see U.S. Pat. No. 4,914,171 for further general and specific details), fluorinated diacrylates (see European Patent Application EP 0 529 895 for further general and specific details), 1,3-bis(2-hydroxyhexafluoro-2-propyl)benzene diacrylate, 1,3-bis(2-hydroxyhexafluoro-2-propyl)benzene dimethacrylate, 1,3-bis(hydroxyperfluoroalkyl)benzene diacrylates and trifluoromethyl analogs of bisphenol A (meth)acrylates.

Tri(meth)acrylates cross-linkers useful in the present invention include, for example, 1,2,4-butanetriol triacrylate, 1,2,4-butanetriol trimethacrylate, glycerol tri-acrylate, glycerol trimethacrylate, pentaerythritol triacrylate, pentaerythritol trimethacrylate, polyoxypropyltrimethylolpropane triacrylate, polyoxypropyl-trimethylolpropane trimethacrylate, silicone triacrylate, silicone trimeth-acrylate, 1,3,5-triacryloylhexahydro-s-triazine, 1,3,5-trimethacryloylhexahydro-s-triazine, trimethylolethane triacrylate, trimethylolethane trimethacrylate, 1,1,1-trimethylol propane triacrylate, 1,1,1-trimethylol propane trimethacrylate, 1,2,3-trimethylol propane triacrylate, 1,2,3-trimethylol propane trimethacrylate, 1,1,1-trimethylol propane tris(acryloxypropionate), 1,1,1-trimethylol propane tris(methacryloxypropionate), 1,2,3-trimethylol propane tris(acryloxypropionate), 1,2,3-trimethylol propane tris(methacryloxypropionate), tris-(2-acryloxyethyl) isocyanurate, tris-(2-methacryloxyethyl) isocyanurate.

Tetra(meth)acrylates cross-linkers useful in the present invention include, for example, pentaerythritol tetraacrylate, pentaerythritol tetramethacrylate, pentaerythritol tetrakis (acryloxypropionate), pentaerythritol tetrakis(methacryloxypropionate).

Polyallylic monomers useful as cross-linkers in the present invention include, for example, diallyl carbonate, diallyl fumarate, diallyl glutarate, diallyl itaconate, diallyl maleate, diallyl phthalate, diallyl succinate, diisopropenylbenzene, triallyl cyanurate, triallyl isocyanurate, triallyl phosphate, and 1,3,5-triisopropenyl-benzene.

Polyvinylic monomers useful as cross-linkers in the present invention include, for example, diethyleneglycol divinyl ether, divinylbenzene, divinyl ketone, divinylpyridine, divinyl sulfide, divinyl sulfone, divinyltoluene, divinylxylene, glycerol trivinyl ether, trivinylbenzene, and 1,2, 4-trivinylcyclohexane, N,N'-methylenebisacrylamide, partially fluorinated α,ω-dienes such as $CF_2$=$CFCF_2CF_2CH_2CH$=$CH_2$ (see PCT Patent Application WO 96/10047 for further general and specific details), trifluoroalkadienes (see U.S. Pat. No. 5,043,490 for further general and specific details), trifluorodivinylbenzenes (see U.S. Pat. No. 5,043,490 for further general and specific details) and fluorinated divinyl ethers of fluorinated 1,2-ethanediol (see U.S. Pat. No. 5,589,557 for further general and specific details). In one embodiment, the polyvinylic monomer is divinylbenzene.

(Meth)acrylic monomers having mixed ethylenic functionality that are useful as cross-linkers in the present invention include, for example, the acrylate ester of neopentyl glycol monodicyclopentenyl ether, allyl acryloxypropionate, allyl acrylate, allyl methacrylate, crotyl acrylate, crotyl methacrylate, 3-cyclohexenylmethyleneoxyethyl acrylate, 3-cyclohexenylmethyleneoxyethyl methacrylate, dicyclopentadienyloxyethyl acrylate, dicyclopentadienyloxyethyl methacrylate, dicyclopentenyl acrylate, dicyclopentenyl methacrylate, dicyclopentenyloxyethyl acrylate, dicycolpentenyloxyethyl methacrylate, methacrylate ester of neopentyl glycol monodicyclopentenyl ether, methallyl acrylate, trimethylolpropane diallyl ether mono-acrylate, trimethylolpropane diallyl ether mono-methacrylate and N-allyl acrylamide. In one embodiment, the (meth)acrylic monomer having mixed ethylenic functionality is allyl methacrylate.

Another route useful to cross-link the shell portion of the latex polymers is based on the use of one or more multifunctional monomers (MFM) to provide post-polymerization cross-linking and reinforcement of the sheath. The MFM comprise at least one functional group capable of vinyl copolymerization and at least one functional group capable of reaction with suitable reactive molecules. Suitable functional groups and reactive molecules for post-polymerization cross-linking of the polymer sheath include, for example, reacting polyol functional groups in the sheath with acid and aldehyde (such as formaldehyde) reactive molecules; reacting siloxane functional groups in the sheath with primary amine or amide reactive molecules; the addition of Zn (II) to poly(acid) functional groups in the sheath; irradiation; heat curing of functional groups in sheath with or without additional initiator; and the addition of anhydride, isocyanate, epoxysiloxane, diepoxide (such as bisphenol A diglycidyl ether) and hydroxy acid reactive molecules to amine, alcohol and carboxyl/(ate) functional groups which make up the sheath matrix.

Multifunctional monomers (MFM) suitable for post-polymerization cross-linking include, for example, vinylsiloxanes, acryloylsiloxane, methacryloylsiloxanes, acetoacetoxyalkyl (meth)acrylates (such as acetoacetoxyethyl methacrylate or AAEM), N-alkylol (meth)acrylamides, epoxy (meth)acrylates (such as glycidyl methacrylate), acryloylisocyanates and methacryloylisocyanates. Suitable vinylsiloxanes include, for example, vinyltrimethoxysilane, vinyltriethoxysilane, vinytrioxy-propylsilane, acrylamidopropyltrimethoxysilanes, methacrylamidopropyltri-methoxysilanes, styrylethyltrimethoxysilane and monomers known as Silquest™ silanes (Whitco Corp., Terrytown, N.Y., USA). Suitable acryloylsiloxanes and methacryloylsilanes include, for example, 3-acryloxypropyltrimethoxysilane, methacryloxypropyltrimethoxysilane, (3-acryloxypropyl)methyldialkoxysilanes and Silquest™ silanes. Suitable N-alkylol (meth)acrylamides include, for example, N-methylol acrylamide, N-methylol methacrylamide, N-butoxymethyl acrylamide, isobutoxymethyl acrylamide and methyl acrylamidoglycolate methyl ether. In one embodiment, the MFM is selected from acetoacetoxyethyl methacrylate, N-methylol methacrylamide and glycidyl methacrylate.

A shell polymer based on MFM as described above may be reacted with reactive molecules selected from amines, diamines, amino acids and aminoalkyltrialkoxysilanes; optionally followed by the addition of other reactive molecules: aldehydes (such as formaldehyde), dialdehydes (such as glutaric dialdehyde), hydrazides and dihydrazides (such as succinic dihydrazide) to form post-polymerization cross-linked sol-gels.

In one embodiment, the emulsion polymers are latex polymer particles containing a void and having a particle size from 20 to 1000 nanometers. The latex polymer particles comprise a shell portion prepared, as described in U.S. Pat. No. 6,384,104, by one or more steps selected from: (i) polymerization to incorporate from 4 to 80 percent monomeric units, based on total weight of the shell portion, of one or more polyethylenically unsaturated monomers; and (ii) polymerization to incorporate from 4 to 80 percent monomeric units, based on total weight of the shell portion, of one or more multifunctional monomers having at least one functional group capable of vinyl copolymerization and at least one functional group capable of reaction with a reactive molecule effective to produce post-polymerization cross-linking.

In a separate embodiment, the emulsion polymers are latex polymer particles including a void and comprise from about 0.1 weight percent to about 50 weight percent of latex particles, based on total weight non-volatiles.

The dry polymer compositions improved by the method of this invention has utility in any application where protection from UV radiation is useful. For example, the improved composition may be used on human skin and hair, such as, for example personal care products, including cosmetics, sunscreens, and hair care products; and incorporated in pharmaceuticals applied to skin and hair. In addition, the method of this invention is also useful in further improving the UV radiation-absorption storage stability of compositions for coatings on plant life, plastics, wood, and metal for example in the form of a clear varnish.

According to one embodiment, polymer particles of the invention are included in a personal care composition, the composition comprising at least one UV radiation absorbing agent and dried latex particles prepared from a latex emulsion, the latex particles from the emulsion including a void and having a particle size of from about 100 nm to about 380 nm before drying, wherein the dried latex particles are added to the composition to increase the UV radiation absorption of the composition.

The polymer particles of the present invention are incorporated in personal care, consumer, coating and pharmaceutical compositions and formulations that increase UV radiation absorption of compositions and provide a method for providing storage stability of such compositions. Radiation-absorption compositions include incorporating from 5 to 70%, also incorporating from 10 to 50% and from 20 to 40%, based on total weight non-volatiles in the composition, of latex polymer particles into the composition containing at least one ultraviolet (UV) radiation-absorbing agent; based on total weight of the composition, the level of latex polymer particles is from 0.5 to 10%, including levels of latex particles from 1 to 7% and from 2 to 5%. As used herein, the term "UV radiation" includes both UVA and UVB radiation.

As used herein, the term "non-volatiles" refers to solid or liquid components of the personal care formulation that do not readily evaporate at ambient temperatures due to their vapor pressure (such as polymer particles, UV radiation-absorbing agents and conventional adjuvants).

Surfactants useful as the surfactant components in the mixed surfactant/emulsion polymers of the present invention include non-ionic, anionic, cationic, and amphoteric (zwitterionic) surfactants and may be used in combination with each other, the selection depending upon compatibility among the surfactants used and with other ingredients of the aqueous compositions. Hydrophilic cationic, amphoteric or zwitterionic surfactants may also or alternatively be used provided that they are compatible with the polymer and other ingredients of the aqueous system in the quantity required by the invention. As used here, compatibility refers to no adverse chemical reaction and/or physical interaction of the polymer and other ingredients of the aqueous system that materially impacts the utility of the polymer within the metes and bounds of the invention.

Non-ionic surfactants are surfactants having no charge when dissolved or dispersed in aqueous solutions. Typical nonionic surfactants useful in the present invention include, for example, ($C_6$-$C_{18}$)alkylphenol alkoxylates (such as t-octyl phenol and nonylphenol ethoxylates having 1-70, and preferably 5-16, ethyleneoxide units), $(C_{12}-C_{20})$alkanol alkoxylates and block copolymers of ethylene oxide and propylene oxide; optionally, the end groups of polyalkylene oxides can be blocked, whereby the free OH groups of the polyalkylene oxides can be etherified, esterified, acetalized and/or aminated. Another modification consists of reacting the free OH groups of the polyalkylene oxides with isocyanates. Useful nonionic surfactants also include, for example, $(C_4-C_{18})$alkyl glucosides as well as the alkoxylated products obtainable therefrom by alkoxylation, particularly those obtainable by reaction of alkyl glucosides with ethylene oxide.

Anionic surfactants are surfactants having a hydrophilic functional group in a negatively charged state in an aqueous solution. Typical anionic surfactants useful in the present invention include, for example, $(C_8-C_{18})$alkyl carboxylic acids, $(C_{12}-C_{20})$sulfonic acids (sulfonated alkylaryl compounds such as sodium dodecylbenzenesulfonate), $(C_{10}-C_{20})$sulfuric acid esters (sulfated alcohols such as lauryl and cetyl sulfates, sodium salts), phosphate esters and salts thereof. Cationic surfactants contain hydrophilic functional groups where the charge of the functional groups is positive when dissolved or dispersed in an aqueous solution. Typical cationic surfactants useful in the present invention include, for example, $(C_{12}-C_{20})$amine compounds (such as lauryl pyridinium chloride, octylbenzyltrimethylammonium chloride and dodecyltrimethylammonium chloride), oxygen containing amines and quaternary amine salts. Amphoteric or zwitterionic surfactants (such as cocamidopropyl betaine) contain both acidic and basic hydrophilic groups and can be used in the present invention.

In one embodiment, non-ionic surfactants, such as alcohol ethoxylates are usefully employed in the present invention. However, mixtures of non-ionic surfactants with anionic surfactants, non-ionic surfactants with cationic surfactants, non-ionic surfactants with amphoteric surfactants, anionic surfactants with amphoteric surfactants, and cationic surfactants with amphoteric surfactants may be used as long as they are compatible and satisfy the balance of hydrophilic-lipophilic (HLB) properties described below.

As used herein, HLB is a value characterizing the relative proportions of hydrophilic and lipophilic (also referred to as hydrophobic) portions of molecules, such as the polyetherurethane associative thickeners and the selected surfactants of the present invention; higher HLB values (those approaching 50) represent the more hydrophilic molecules and the lower HLB values (those around 6 to 10) represent the more hydrophobic molecules. HLB values may be calculated or determined by a variety of known procedures, such as those described in "Surfactants and Interfacial Phenomena" by Milton J. Rosen, John Wiley and Son, New York, N.Y., page 244 (1978) and "Interfacial Phenomena" by J. T. Davies and E. K. Rideal, Academic Press, 2nd Edition, pp 373-383 (1963).

The HLB range of the one or more surfactants usefully employed in accordance with the invention will vary depending on the nature of the aqueous emulsion polymer. The HLB range usefully employed for most aqueous emulsion polymers is between 10 and 25, depending on the hydrophilic/hydrophobic character of monomers used to prepare a specific emulsion polymer and the water solubility/insolubility of the resulting emulsion polymer. At relatively lower HLB values, in this embodiment, the surfactant(s) is not water soluble enough to combine with the primary particles of the aqueous emulsion polymers. Drying the combination of surfactant and emulsion polymer results in little or no lowering of dusting levels in the resulting polymer solids. At relatively higher HLB values, the surfactant(s) is too water soluble and drying this combination of surfactant and emulsion polymer results in little or no lowering of dusting levels in the resulting polymer solids.

In one embodiment, combining one or more specific emulsion polymers and one or more surfactants having an HLB value between 13 and 16 unexpectedly results in flowable dry polymer solids having little to no dusting. Moreover, the dry polymer solids have increased particle size, no decrease in bulk density, low MEP and lowered Kst values. The specific emulsion polymers include latex polymer particles containing a void and having a particle size from 20 to 1000 nanometers. The latex polymer particles comprise a shell portion prepared, as described in U. S. Pat. No. 6,384,104, by one or more steps selected from: (i) polymerization to incorporate from 4 to 80 percent monomeric units, based on total weight of the shell portion, of one or more polyethylenically unsaturated monomers; and (ii) polymerization to incorporate from 4 to 80 percent monomeric units, based on total weight of the shell portion, of one or more multifunctional monomers having at least one functional group capable of vinyl copolymerization and at least one functional group capable of reaction with a reactive molecule effective to produce post-polymerization crosslinking.

In an embodiment when two or more surfactants are combined, the first surfactant of two or more surfactants is referred to as $S_1$ and may have a different HLB value than that of a second surfactant, $S_2$. The magnitude of the difference between $S_1$ and $S_2$ regarding calculated HLB values is indicative of the relative weight ratio of $S_1/S_2$ required to produce the desired effects when combined with the aqueous compositions of the present invention prior to drying. In general, the weight ratio of $S_1/S_2$ is from 30/70 to 99.5/0.5. Generally, as the magnitude of the difference in $S_1$ and $S_2$ HLB values increases, the preferred ratio of $S_1/S_2$ increases, that is, a greater amount of the more hydrophobic (lower HLB) surfactant relative to the more hydrophilic (higher HLB) surfactant will provide the best effect, when combined with one or more emulsion polymers, for reducing dusting of the emulsion polymer after drying. The HLB range will vary depending on the nature of the aqueous emulsion polymer.

In addition to the differences in the HLB values of the two or more surfactants and the required ratio of $S_1/S_2$, the overall weighted average HLB value for the $S_1$ and $S_2$ surfactants is an important parameter. Generally, the weighted average HLB value (see formula I):

$$([\text{weight fraction of } S_1]\times[HLB(S_1)]+[\text{weight fraction of } S_2]\times[HLB(S_2)]) \quad (I)$$

is between 10 and 25, where the weight fraction is based on the combined weights of $S_1$ and $S_2$.

In general, the ratio of the combined amount of the two or more surfactants, $S_1$ and $S_2$, to the amount of aqueous emulsion polymer in the aqueous compositions of the present invention is from 0.5/1 to 20/1.

Suitable amounts of the aqueous emulsion polymers used in the mixed surfactant/aqueous emulsion polymer of the present invention are from 0.01 weight percent to 5 weight percent, based on weight of aqueous composition.

Typical combined amounts of the one or more surfactants used in the mixed surfactant/aqueous emulsion polymer of the present invention are from 0.01 weight percent to 30 weight percent, based on weight of aqueous composition.

Accordingly, inventors have discovered a process for manufacturing dry polymer solids having reduced dusting comprising the steps of: (a) combining one or more emulsion polymers and one or more surfactants having an HLB value between 10 and 25; and (b) drying the combination.

The surfactant and emulsion polymer mixture is isolated from the aqueous emulsion by conventional techniques including but not limited to evaporation, evaporation under reduced pressure, spray drying and fluidized spray drying. The drying technique usefully employed according to the invention will vary depending on the nature of the aqueous emulsion polymer, the surfactant(s) utilized and combinations thereof.

Spray drying is an economical, safe and desirable means of isolating dispersions of aqueous emulsion polymers, namely core-shell polymer particles as free-flowing powders. During this process an aqueous dispersion of core-shell polymer particles is atomized in a chamber containing heated air, water is removed, and the core-shell polymer particles are aggregated into dry powder particles. The method of the present invention obviates numerous problems associated with spray drying polymer latex dispersions of the invention to form dried polymer solids in the form of polymer particles and polymer powders. These problems include: (1) sticking of the particles to the chamber walls of the spray dryer; (2) bridging of the particles over conveying lines entrances; and (3) unacceptable powder flow characterized by aggregation, clumping, and flow interruptions. Another advantage the method of the present invention offers is improved control of polymer spray drying with little to no surfactant deposited or stuck on the walls of the spray drying unit.

Inventors have discovered a manufacturing process for preparing polymeric granules that are comparatively non-dusting solids that are flowable powders and that have desired rheology and mechanical properties for incorporating into compositions and formulations including those used in personal care, cosmetic, consumer, and pharmaceutical products. Inventors have additionally discovered a process for manufacturing dry polymer granules from dispersions of emulsion polymers such that the dry polymer solids that are provided exhibits no decrease in powder bulk density and provides polymer powders having larger mean particle size with a small distribution of fines. In the process, spray drying of polymer latex dispersions as described above with selected surfactants under relatively low pressure achieves non-dusting polymer solids that are flowable, having desirable rheology and powder properties. Moreover, the granulated solids exhibit increased MIE, lowered or unchanged MEP and lowered Kst values such that they can be safely processed, manipulated and stored.

In one embodiment, the invention provides a process for manufacturing dry polymer solids having reduced dusting comprising the steps of: (a) combining one or more emulsion polymers and one or more surfactants having an HLB value between 10 and 25; and (b) spray drying an aqueous dispersion of the combination to achieve a powder particle size ranging from 1 μm to 1000 μm.

In a separate embodiment, the invention provides a process for manufacturing dry polymer solids having reduced dusting comprising the steps of: (a) combining one or more emulsion polymers and one or more surfactants having an HLB value between 13 and 16; and (b) spray drying an aqueous dispersion of the combination to achieve dry, flowable polymer solids having increased MIE, low MEP and lowered Kst values.

In a separate embodiment, the invention provides flowable, dry polymer solids having reduced dusting comprising: (a) one or more emulsion polymers (b) one or more surfactants having an HLB value between 13 and 16; wherein dry, flowable polymer solids having increased particle size, no decrease in bulk density, lowered or unchanged MEP and lowered Kst values result from spray drying of an aqueous dispersion of the combination of emulsion polymer and surfactant.

In a separate embodiment, the invention provides flowable, non-dusting solids, comprising:

(a) a first population of polymer particles; and (b) a second population of polymer particles;

wherein the polymer particles are prepared by spray drying an aqueous dispersion of one or more emulsion polymers and one or more surfactants having an HLB value between 10 and 25, wherein the mean particle diameter of the first population of polymer particles is at least 50 percent larger than the mean particle diameter of the second population of particles, and wherein resulting polymer solids having increased particle size, increased MIE, lowered or unchanged MEP and lowered Kst values.

In a separate embodiment, the invention provides a process for manufacturing flowable, non-dusting polymer solids, comprising:

(a) providing a polymer dispersion, the polymer dispersion comprising:

(i)a first population of polymer particles and (ii)a second population of polymer particles; and (b) spray drying the polymer particle dispersion wherein the polymer particles are prepared by spray drying an aqueous dispersion of one or more emulsion polymers and one or more surfactants having an HLB value between 10 and 25, wherein the mean particle diameter of the first population of polymer particles is at least 50 percent larger than the mean particle diameter of the second population of particles, and wherein resulting polymer solids having increased particle size, increased MIE, lowered or unchanged MEP and lowered Kst values.

As used herein, combinations of two polymer populations which vary in particle size are describable using three main variables: weight percent of large population "mode", particle size of the large mode, and particle size of small mode. Diameter Ratio (DR) is equal to the diameter of the large mode (Dlarge) divided by the diameter of the smaller mode (Dsmall). From a theoretical standpoint the optimum value of DR for maximizing packing density ranges from 7 to 10.

As used herein, maximum explosion pressure (MEP) is referred to as the difference between the pressure at ignition time (ambient pressure) and the pressure at culmination point of explosion. Both the MEP and explosion severity values (Kst value) were measured in a 20 liter apparatus or in a 1 $m^3$ vessel at different polymer powder (fuel) concentrations according to test conditions specified in ISO 6184/1 (1995) and ASTM Standard E1226 (1991). All measurements were performed by Chilworth Technology, Inc., Monmouth Junction, N.J. The test is done over a wide range of concentrations in each case a maximum pressure value is obtained. Minimum ignition energy (MIE) is the lowest electrically induced ignition energy obtained by means of a capacitive discharge which is able to produce ignition of a polymer dust cloud. The test device used was a Hartmann Vertical Tube of 1 liter volume and the measurements were performed according to ASTM E-2019 Standard Test method, British standard method BS 5958: part 1 (1991), or Fortschritt-Bereichte VDI, Reihe 3: Verfahrentechnik Nr 134, Germany. The energy is calculated from the equation $E=\frac{1}{2}CV^2$, where C is the electrical capacitance of the capacitors connected to the discharge circuit and V is the electrical voltage applied.

In providing dry flowable powders that are non-dusting by spray drying polymer particle dispersions, it is desirable that the viscosity of emulsion polymer dispersion be less than 2000 centipoise. In a separate embodiment, the viscosity of polymer latex dispersion is less than 1200 centipoise. These viscosities are measured using a Brookfield viscometer with a #3 spindle operating at 30 RPM. Polymer dispersions which have viscosities greater than 2000 centipoise can be suitably diluted, such as by addition of an aqueous liquid, to reduce the viscosity to 2000 centipoise or less.

Without being bound to any theory, inventors believe that the addition of surfactants usefully employed in accordance with the invention to these polymer dispersions improves their shear stability during spray drying, resulting in flowable solids that are relatively non-dusting.

In the present invention, a typical polymer powder particle population has a mean particle diameter less than 1000 microns. In a separate embodiment, the polymer powder particle population typically has a mean particle diameter less than 800 microns. In a separate embodiment, the polymer powder particle population typically has a mean particle diameter less than 500 microns. In yet another separate embodiment, the polymer powder particle population typically has a mean particle diameter greater than 1 micron.

Spray drying can be conducted in any of a variety of designs. The core-shell polymer particle dispersion is atomized either by a wheel or by a nozzle, and the drying gas can enter from the top or the bottom of the atomization chamber. The drying gas is typically heated air or nitrogen to provide a powder temperature which is between the outlet temperature and wet bulb temperature of the drying gas.

In one embodiment, powder temperatures are maintained less than 80° C., typically less than 65° C., and more typically less than 55° C. to provide free-flowing powders. Likewise, powder temperatures are maintained greater than 20° C., typically greater than 30° C., and more typically greater than 40° C. to provide free-flowing powders at efficient production rates.

Optionally, in the spray drying process, flow aid may be blown into the atomization chamber by a separate gas stream or fed into the atomization chamber at such a rate to give the desired weight percentage based on total polymer particles. Suitable flow aids are described in detail in European Patent Publication No. EP 1 201 692 A1.

The spray dried polymer powders of the present invention have a mean particle diameter of at least 1 micron. In one embodiment the spray dried powders of the present invention are characterized by having a mean particle diameter of between 75 and 500 microns. In a separate embodiment the spray dried powders of the present invention are characterized by having a mean particle diameter of between 75 and 800 microns. Powder particles larger than 1000 microns are typically undesirable, and are subsequently filtered out of the powdery polymer product.

The spray dried powders of the present invention are characterized as free-flowing and low to no-dust. Typically, these powder properties are achieved when the water content is typically less than 5 weight percent. In one embodiment, these powder properties are achieved when the water content is between 0.5 to 2.0 weight percent.

One variation of the present invention includes adding one or more other known plastic additive compositions, in either powder or aqueous form. These additives can be optionally blended into the composition before, during, or after the final spray drying step using standard equipment such as high-speed mixers, blenders, kneaders, extruders, fluidized drying beds. Other ingredients typically blended in thermoplastic formulations, such as lubricants, thermal stabilizers, waxes, dyes, pigments, fillers, may each have an aqueous solution, liquid, powdered, or pellet form, and may also be included in the present invention using this mixing equipment.

Two or more populations of the core-shell polymer particles used in the present invention can be provided for in a number of ways known in the art of polymer science. One method involves blending of distinct polymer particle dispersions, e.g., those prepared by emulsion polymerization, each having their own particle size; and in-situ formation and polymerization of a second particle population in the presence of a previously polymerized particle population. In another method, free radical emulsion polymerization techniques are used while providing polymer seeds at different points in the process to provide for two or more populations of core-shell polymer particles. Spray drying of two or more populations of the core-shell polymer particles are described in European Patent Publication No. EP 1 201 692 A1.

In the processes for preparing the polymer particle dispersions as provided herein, it is typical that the weight percentage of the polymer particles is at least 25 weight percent; and more typically at least 40 weight percent, and even more typically at least 50 weight percent. In the processes for preparing the polymer particle dispersions as provided herein, it is typical that the weight percentage of the polymer particles is no more than 75 weight percent, including no more than 65 weight percent, and no more than 60 weight percent.

In a separate embodiment, two or more populations of core-shell polymer particles can also be provided by an emulsion polymerization process in which a second (or subsequent) population of polymer particles is created in the presence of a first (or previous) population. The following procedure is illustrative: Starting with at least one seed polymer particle population in a reaction mixture, add additional soap, and add a portion of a monomer mixture and initiator to form a second (or subsequent) population of polymer particles of different size. Next, polymerize the remaining monomers in the monomer mixture to result in at least two populations of polymer particles which have mean particle diameters that vary by more than 50 percent.

When the spray-driable polymer latex dispersion is in an emulsion form, the dispersion may further contain emulsifiers, stabilizers, ionic salts, acid or base, oligomeric species and additional surfactants. In an emulsion form, the polymer particles are typically synthesized by an emulsion process or prepared by an alternative polymerization process and then subsequently emulsified. More typically, the polymer dispersions are prepared using emulsion polymerization techniques using various ethylenically unsaturated monomers such as those based on acrylics, dienes, vinyl-halides, vinyl aromatics, ethylene-vinyl acetates, and combinations thereof.

In the spray-driable polymer particle dispersion having either two and three particle populations, it is also envisioned that the chemical compositions of the polymer particles in the first and second populations are substantially the same, or different. They also can be substantially physically the same or different. An example of a physical difference is wherein the ethylenically unsaturated monomers form a polymer having different glass transition temperatures (Tg) according to the Fox equation. Typically, rubbery polymers have a Tg less than 25° C. For providing polymer Tg less than 25° C., typical monomers include: C1 to C18 alkyl acrylates such as butyl acrylate, ethyl acrylate, 2-ethylhexyl acrylate; diene monomers; vinyl acetate monomers; and copolymers thereof.

In a separate embodiment, the core-shell polymer particles used in the present invention are such that the ethylenically unsaturated monomers used to form an outer polymer phase forms a polymer having a Tg according to the Fox equation of at least 25° C., which is typically characteristic of forming hard polymers. For Tg greater than 25° C., typical monomers include: C1-C4 alkyl methacrylates; vinyl aromatic monomers, acrylonitrile monomers, and copolymers thereof One skilled in the art can combine various ethylenically unsaturated monomers in various ratios for the purposes of preparing "hard" versus "soft", and "brittle" versus "rubbery" polymer phases in one or more specific embodiments of the core-shell polymer particle populations used in the present invention.

In one alternative embodiment of the process for preparing a spray-driable polymer particle dispersion, a dispersion of solid or liquid lubricant particles may also be incorporated in the spray-driable polymer particle dispersion by emulsifying the solid or liquid lubricant in water or other non-solvent with a surfactant and shear mixing. The lubricant dispersion is then mixed into the spray-driable polymer particle dispersion. In a similar fashion, the solid or liquid lubricant may be emulsified in an emulsion, latex, dispersion, or suspension containing one or more other components of the spray-driable polymer particle dispersion as another embodiment. One specific example is where the lubricant may be emulsified by adding a surfactant and shear mixing in a high solids emulsion containing the two or more populations of core-shell polymer particles. In a similar fashion, because thermal stabilizers are mostly provided as liquids, oils, or solids which are typically non-soluble in water, thermal stabilizers may also be emulsified and added to the spray-driable polymer particle dispersion according to these procedures. The spray-driable polymer particle dispersion may also contain stabilizers and lubricants which can be incorporated into the water component using organic solvents. Because stabilizers and lubricants are typically insoluble in water, they may be incorporated into the liquid component of the spray-driable polymer particle dispersion by using organic solvents and/or soap to help dissolve or disperse them. In this regard, various solvent/oil/aqueous/soap combinations may be employed to provide dispersions or solutions of one or more additives, such as stabilizers and lubricants, in the water component of the spray-driable polymer particle dispersion.

As used herein the term "rubbery" used herein denotes the thermodynamic state of a polymer above its glass transition temperature. The term "stage" used herein is intended to encompass its broadest possible meaning, including the meaning conveyed in prior art such as in U.S. Pat. Nos. 3,793,402; 3,971,835; 5,534,594; and 5,599,854; which offer various means for achieving "staged" polymers. The term "parts" used herein is intended to mean "parts by weight". Unless otherwise stated, "total parts by weight" do not necessarily add to 100. The term "weight percent" used herein is intended to mean "parts per hundred by weight" wherein the total parts add to 100. The term "weight fraction" used herein is synonymous with "weight percentage", when it is evident that the total parts described add to 100. The term "solids weight fraction" used herein is intended to mean the weight percentage of the dried residue based on the total weight of an aqueous particle dispersion that is dried to constant weight. The term "particle size" used herein refers to the mean particle diameter of a population of particles. The term "mode" used herein refers to a particular population of particles as in "large mode" and "small mode". The term "core-shell" used herein refers to polymer particles which typically have at least one outer polymer phase externally situated adjacent to an inner polymer phase; the outer phase may be situated as a single phase (shell) or as multiple phases (islands) on the inner polymer phase (core). The use of the term "first population" and "second population" as used herein is merely used for the sake of convenience in identifying two different populations of polymer particles and has no connotation relating to process order. As used herein, the term "compaction-free" refers to powdery compositions which are not compactable into a single mass by manually squeezing a handful of the powdery composition. The Fox Equation as used herein is: $1/Tg=a/Tg(A)+b/Tg(B)+c/Tg(C)+\ldots$ wherein a, b, c, etc. refer to the weight fraction of monomeric components A, B, C, etc. respectively, and Tg(A), Tg(B), Tg(C), etc. refer to the glass transitions for the homopolymers derived from monomers A, B, C, etc., expressed in degrees Kelvin. These glass transition temperatures are defined according to the results obtained using differential scanning calorimetry (DSC) in the high molecular weight limit.

The method of this invention may be used to further improve the UV radiation-absorption storage stability of either clear or pigmented formulations. The method is particularly useful if a clear formulation is desired, such as a sunscreen formulation, because the addition of the latex polymer particles having a particle size of less than 500 nm, including particle sizes less than 450 nm and those less than 350 nm, does not significantly contribute to whiteness. The method of this invention enables formulators to either increase the UV radiation-absorbance of a given formulation or reduce the level of the UV radiation-absorbing agent present in the formulation while maintaining a given UV radiation-absorbance for extended periods of time.

While not wishing to be bound by any theory, inventors believe that the cross-linked nature of the shell of the latex polymer particles improves the storage stability of the UV radiation-absorbing compositions by inhibiting the penetration of the shell, the uptake by the shell, or both, of oil-soluble additives present in the formulated composition (improved chemical resistance). When latex polymer particles are included in sunscreen formulations, where the shell portion of the particles is uncross-linked or lightly cross-linked, the initial SPF enhancement effect (%SE) is apparent; however, the durability of the enhancement effect diminishes rapidly with time because of interaction of conventional adjuvants (for example, oils, emollients or the UV radiation-absorbing agent present in personal care formulations) with the latex polymer particle, destroying the integrity of the particles. However, when the shell is cross-linked to a level of at least 4% and preferably at least 10%, based on total weight of the shell polymer (as in the present invention), we believe that the detrimental effect of personal care composition additives on the duration of UV radiation-absorption enhancement is significantly reduced.

Compositions and formulations incorporating the dry polymer solids of the invention prepared by the method of this invention may be applied to the skin at coating volumes, for example, of from about 0.5 microliters per square centimeter (μL/$cm^2$) to about 4 μL/$cm^2$.

Some embodiments of the invention are described in detail in the following Examples. All ratios, parts and percentages are expressed by weight unless otherwise specified, and all reagents used are of good commercial quality unless otherwise specified. The following abbreviations are used in the Examples:

| | |
|---|---|
| MMA = | Methyl Methacrylate |
| BMA = | Butyl Methacrylate |
| ALMA = | Allyl Methacrylate |
| MAA = | Methacrylic Acid |
| DVB = | Divinylbenzene (80% active, 20% ethylvinylbenzene) |
| Sty = | Styrene |
| SSS = | Sodium Styrene Sulfonate |
| AAEM = | Acetoacetoxyethyl Methacrylate |
| SDBS = | Sodium Dodecylbenzenesulfonate |
| TMPTA = | Trimethylolpropane Triacrylate |
| TEGDA = | Tetraethyleneglycol Diacrylate |
| PBW = | Parts by Weight |
| XL = | Crosslinker |
| NA = | Not Analyzed |
| MFM = | Multifunctional Monomer |

Latex polymer particles and core shell polymer dispersions described in Example 1 were prepared similarly to the method described in U.S. Pat. Nos. 4,427,836 and 6,384,104. Core polymers typically had an average particle diameter of 90 to 150 nm (or 0.09 to 0.15 μ). Polymer #34 was selected as a representative polymer containing no surfactant used as a control and was identified as sample 1. Sample 1 was combined with an acrylic polymer (Acusol™ 460 ND, available from Rohm and Haas company, Philadelphia, Pa.) used to prepare dry solids and used as a comparative (sample 2). Sample 1 was also combined with two specific surfactants (Neodol™25-9, obtained from Vista Chemicals, Hammond Ind.) and Span™ 80 (obtained from ICI Chemicals/Uniqema, Boston Mass.), identified as samples 3 and 4, respectively.

EXAMPLE 1

(Preparation of Samples 1-4)

Polymer #34 was prepared according to the method described in U.S. Pat. No. 6,384,104 and used as a control identified as sample 1. An aqueous dispersion of the polymer was prepared as a control by dilution with water so that it contained 30 wt. % polymer solids (sample 1). Sample 2 was prepared by diluting a mixture of sample 1 with Acusol™ 460 ND with water 97:3 on a weight percent basis so that it contained 27 wt. % polymer solids and 3 wt. % of Acusol™ 460 ND as solids. Sample 3 was prepared by diluting a mixture of sample 1 with a commercially available surfactant (Neodol™ 25-9) with water 97:3 on a weight percent basis so that it contained 27 wt. % polymer solids and 3 wt. % of Neodol™ 25-9 as solids. Sample 4 was prepared by diluting a mixture of sample 1 with a different type of surfactant (Span™ 80) with water 99:1 on a weight percent basis so that it contained 29 wt. % polymer solids and 1 wt. % of Span™ 80 as solids.

Spray drying of the sample 1 as a control, sample 1 with a commercially available polymer that reduces dusting for certain leather solids as a comparative and in combination with the two commercially available surfactants is described in Example 2.

EXAMPLE 2

(Spray Drying of Emulsion Polymer Dispersions, Samples 1-4)

The aforementioned polymer particle dispersions were spray dried using a Niro™ Pilot Spray Dryer (Model P6.3). The spray dryer was equipped with a standard vaned wheel atomizer. Samples 1 and 2 were spray dried under the same drying conditions. The drying conditions are characterized by a feed rate of 35 to 40 lbs/hr (15.7 to 16.9 kg/hr) of liquid, a wheel speed of 9,600 rpm and a final overall powder moisture level between 0.7 to 0.9 weight percent. A free flowing, low dusting polymer powder having a mean powder particle diameter of 57 microns and a bulk powder density of 0.262 grams per liter was produced for sample 1 when combined with a commercially available non-ionic surfactant (sample 3). Compaction-free powder was evident for samples with and without non-ionic surfactant, as the resulting powders did not stick together in a solid mass when hand-squeezed.

Compaction-free powder were obtained as a result of spray drying samples 1-4. There were no anomalous changes in bulk densities of samples 1-4, respectively from a chamber cut as compared to a cyclone cut. Mean particle sizes of samples 1-4 ranged from 25 to 85 microns, depending on the spray dryer region where the powders were sampled. The weight percent of fines (defined as the fraction of powder particles having a particle size<10 microns) ranged from 1.5 to 5.5, depending on the spray dryer region where the powders were sampled. The moisture levels of samples 1-4, measured as a weight percent, was between 0.5 to 2.0, depending on the spray dryer region where the powders were sampled. Sample 1 clearly exhibited significant dusting from visual inspection and from measured powder properties described above. Sample 2, a polymer used to reduce dusting in leather solids was ineffective in lowering dust levels of polymer #34 and clearly exhibited significant dusting from visual inspection and from measured powder properties described above. Sample 4, containing the surfactant Span™ 80, was ineffective in lowering dust levels of polymer #34 and clearly exhibited significant dusting from visual inspection and from measured powder properties described above. Only sample 3 exhibited markedly lower dusting levels, a higher MIE, a MEP that did not increase significantly relative to the control, and markedly lowered Kst values as compared to control sample 1. The results of spray drying of samples 1 and 3 are summarized in Table 1.

TABLE 1

Selected powder particle data for samples 1 and 3.

| Sample | Spray Dryer Region | Moisture Level (wt. %) | Bulk Density Loose (g/cc) | Mini-Box Compaction Test 100 g, 7.6 cm square cube 800 g weight T = 178° F. for 30 minutes | Measured Powder Particle Size (Using Coulter) "MPS" Mean | % < 75□m | % < 45□m | % < 10□m | MEP[a] Maximum Explosion Pressure (bar) | Kst[a] (VDI 3673) Explosion Strength (bar · m · sec⁻1) | MIE[a] Minimum Ignition Energy (mJ) |
|---|---|---|---|---|---|---|---|---|---|---|---|
| 1[b] | Chamber Cut | 1.5 | 0.293 | no compaction | 70 | 53.3 | 13.5 | 0.6 | | | |
| | Cyclone Cut | 0.6 | 0.225 | | 26 | 99.8 | 83.7 | 5.3 | | | |
| | Chamber + Cyclone Mix | | | | | | | | 8.4 | 317 | 5-10 |
| 3[c] | Chamber Cut | 1.9 | 0.262 | no compaction | 81 | 39.3 | 13.6 | 0.6 | | | |
| | Cyclone Cut | 1.0 | 0.222 | | 40 | 89.0 | 52.6 | 2.4 | | | |
| | Chamber + Cyclone Mix | | | | | | | | 8.9 | 264 | 10-25 |

[a]Dust Cloud Explosivity Properties (powder sieved < 75 μm).
[b]Calculated Weight Average Powder Particle Size of Chamber/Cyclone Blend 45 μm.
[c]Calculated Weight Average Powder Particle Size of Chamber/Cyclone Blend 57 μm.

The data in Table 1 clearly show that combining polymers described herein with a selected surfactants (sample 3) having HLB values between 10 and 25 via spray drying is an effective process for markedly lowering the dusting levels and markedly raising the MIE of such polymer particulates. Applicants believe that the latex particles when combined with appropriate surfactants are segregated into aggregates that apparently render them as low dusting, free-flowing particles that can be safely processed by virtue of lowered explosion strength (Kst) and increased MIE, as compared to their respective polymers in the absence of said surfactants. Spray drying of the polymer dispersions containing one or more surfactants having an HLB value between 10 to 25, as usefully employed in accordance with the present invention, offers the advantages of rendering the dry polymer solids free flowing while obviating the problem of dusting, not increasing the MEP, lowering the Kst values and increasing the MIE for such polymer solids and provides a process for the safe and efficient manufacture of spray dried polymer solids. Spay dried polymer solids that could not be safely handled by spray drying, respectively, in the absence of such surfactants.

We claim:

1. A process for manufacturing a dry flowable powder polymer composition having a reduced dusting comprising the steps of: (a) combining one or more emulsion polymers and one or more surfactants having an HLB value between 10 and 25; and (b) drying the combination to a powder by spray drying or fluidized spray drying; wherein the emulsion polymers comprise latex polymer particles comprising a shell portion which is 10 to 60 percent cross-linked, and is prepared by one or more steps selected from: (i) polymerization to incorporate from 10 to 60 percent monomeric units, based on total weight of the shell portion, of one or more polyethylenically unsaturated monomers; and (ii) polymerization to incorporate from 10 to 60 percent monomeric units, based on total weight of the shell portion, of one or more multifunctional monomers having at least one functional group capable of vinyl copolymerization and at least one functional group capable of reaction with a reactive molecule effective to produce post-polymerization cross-linking.

2. The process of claim 1, wherein the surfactants are non-ionic surfactants.

3. The process of claim 2, wherein the combination is dried to a water content of less than 5% by weight.

* * * * *